G. L. HALLENBECK.
MARKING ATTACHMENT FOR PLANTERS.
APPLICATION FILED NOV. 4, 1912.
1,058,054.
Patented Apr. 8, 1913.
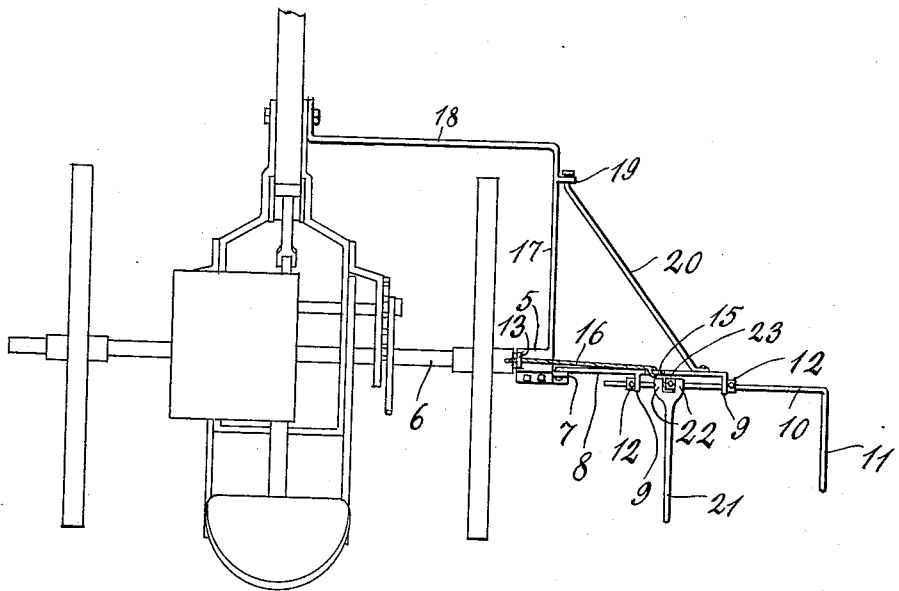
Fig. 1.
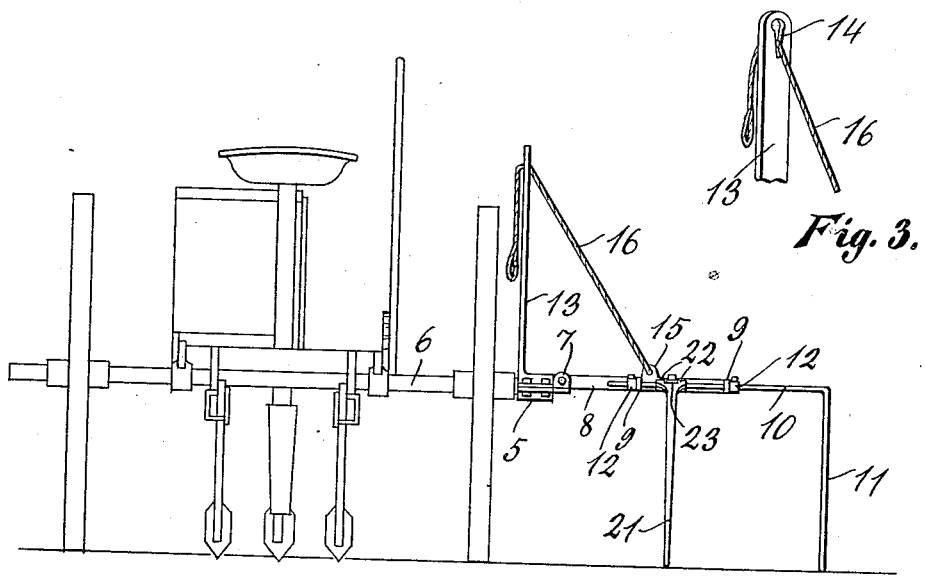
Fig. 2.
Fig. 3.
Witnesses
Einar Larson
M. Schmidt
Inventor
G. L. Hallenbeck.
By Eugene E. Stevens
Attorney
COLUMBIA PLANOGRAPH CO., WASHINGTON, D. C.

UNITED STATES PATENT OFFICE.

GARRETT L. HALLENBECK, OF LOMETA, TEXAS.

MARKING ATTACHMENT FOR PLANTERS.

1,058,054.  Specification of Letters Patent.  Patented Apr. 8, 1913.

Application filed November 4, 1912.  Serial No. 729,228.

*To all whom it may concern:*

Be it known that I, GARRETT L. HALLENBECK, a citizen of the United States, residing at Lometa, in the county of Lampasas and State of Texas, have invented certain new and useful Improvements in Marking Attachments for Planters, of which the following is a specification.

The device which is the subject of the present invention is designed for attachment to planters, cultivators and the like, for the purpose of marking off the distance between the rows, and it consists of a marker which projects laterally from the machine and makes a mark in the ground to form a guide for the driver of the machine.

It is the object of the invention to provide an attachment of the kind stated which can be raised or lowered without the operator leaving his seat on the machine, and also to provide novel and improved means for mounting the marker so that it can pass over obstructions without getting out of line.

Other objects and advantages of the invention will be pointed out in the detailed description appearing hereinafter, reference being had to the accompanying drawing, in which—

Figure 1 is a plan view of the machine showing the invention applied thereto; Fig. 2 is a rear end view thereof, and Fig. 3 is a detail in perspective showing a holder for the hoisting line to be hereinafter described.

The device is shown applied to a planter, but it is to be understood that it may also be applied to riding cultivators, plows etc. The construction of the planter or other machine is immaterial to the invention and a detailed description thereof is therefore deemed unnecessary.

Referring specifically to the drawing, 5 denotes a collar which is clamped to the axle 6 of the machine. The entire marking device is carried by this collar, in view of which the invention can be readily attached to the machine without in the least altering or modifying the structure thereof. One end of the collar 5 is formed with an ear 7 to which is pivoted, so as to swing in a vertical plane, an arm 8 having outstanding bearings 9 in which is journaled a rod 10 which extends parallel to the arm and projects from the free end thereof. The extremity of the rod has a lateral bend 11 which is the marker proper. The arm and rod extend laterally of the machine, and the bend 11 is of such a length that it trails over the ground to mark a guide line for the driver of the machine. The rod is loose in its bearings, in view of which the marker is free to swing upward and thus pass over any obstructions which it may encounter when in operation, so that it will not get out of line but continue to mark a straight line parallel to the line of travel of the machine. Longitudinal movement of the rod 10 is prevented by collars 12 thereon which abut against the bearings 9. The collar 5 also carries an upstanding arm 13 having at its upper end a V-shaped aperture 14. Near the free end of the arm 8 is an ear 15 to which is connected a line 16 which extends inward toward the arm 13 and is adapted to be passed through the aperture 14, the shape of which latter serves to clamp the line. The purpose of the line is to raise and lower the arm 8, and after this is done the line is secured in the aperture. The upper end of the arm 12 is near the driver's seat, and is therefore within easy reach of the driver, in view of which the marker can be readily raised or lowered without the driver leaving his seat. To the collar 5 is also secured a brace-bar 17 which extends forward, outside the wheel of the machine, and has at its forward end a lateral bend 18 to clear the wheel. The bend 18 fastens to the tongue or frame of the machine in any convenient manner.

The brace-bar 17 carries an ear 19 to which is loosely connected one end of a brace-bar 20, the other end of which latter is made fast to the arm 8 near the outer end thereof. A loose connection is provided in order that the brace-bar 20 may not interfere with the raising or lowering of the arm 8.

A marking device constructed as herein described is strong and durable, and simple in construction, and it can be readily put on the machine and easily controlled. Only one side of the machine is provided with the device, but if a double row is wanted, another device can be put on the other side of the machine.

The rod 10 may also be provided with an extra marker arm 21. This arm has spaced perforated ears 22 through which the rod passes. A set collar 23 on the rod, between the ears, holds the arm against longitudinal movement on the rod. The arm is loosely mounted on the rod and is therefore free to swing upward and clear obstructions without interfering with the swing of the marker 11. The arm may be placed anywhere on the rod, and is held in place by the collar 23.

I claim:

A marker for agricultural machines comprising a support carried by the machine, a lateral arm pivoted to the support to swing in a vertical plane and having bearings, a rod loosely mounted in the bearings to rock therein, said rod having a lateral bend at its extremity which bend forms a marker, and a second marker loosely mounted on the rod to swing in a vertical plane.

In testimony whereof I affix my signature in presence of two witnesses.

GARRETT L. HALLENBECK.

Witnesses:
J. T. McCarson,
C. M. Swinney.

Copies of this patent may be obtained for five cents each, by addressing the "Commissioner of Patents, Washington, D. C."